July 31, 1951 G. W. BILL 2,562,257

TELEVISION RECEIVER CABINET CONSTRUCTION

Filed July 28, 1950 7 Sheets-Sheet 1

INVENTOR.
GEORGE W. BILL
BY Alfen D. Redfield
Charles M. Logan
ATTORNEYS.

July 31, 1951 G. W. BILL 2,562,257

TELEVISION RECEIVER CABINET CONSTRUCTION

Filed July 28, 1950 7 Sheets-Sheet 2

INVENTOR.
GEORGE W. BILL
BY Alden D. Redfield
Charles M. Hogan
ATTORNEYS.

July 31, 1951 G. W. BILL 2,562,257

TELEVISION RECEIVER CABINET CONSTRUCTION

Filed July 28, 1950 7 Sheets-Sheet 3

INVENTOR.
GEORGE W. BILL
BY Alden D. Redfield
Charles M. Hogan
ATTORNEYS

July 31, 1951 G. W. BILL 2,562,257

TELEVISION RECEIVER CABINET CONSTRUCTION

Filed July 28, 1950 7 Sheets-Sheet 4

INVENTOR.
GEORGE W. BILL
BY Alden D. Redfield
Charles M. Hogan
ATTORNEYS.

July 31, 1951 G. W. BILL 2,562,257

TELEVISION RECEIVER CABINET CONSTRUCTION

Filed July 28, 1950 7 Sheets-Sheet 5

INVENTOR.
GEORGE W. BILL
BY
Alden D. Redfield
Charles M. Hogan
ATTORNEYS.

TELEVISION RECEIVER CABINET CONSTRUCTION

Filed July 28, 1950 7 Sheets-Sheet 6

INVENTOR.
GEORGE W. BILL
BY
Alden D. Redfield
Charles M. Logan
ATTORNEYS.

July 31, 1951 G. W. BILL 2,562,257

TELEVISION RECEIVER CABINET CONSTRUCTION

Filed July 28, 1950 7 Sheets-Sheet 7

INVENTOR.
GEORGE W. BILL
BY Alden D. Redfield
Charles M. Hogan
ATTORNEYS

Patented July 31, 1951 2,562,257

UNITED STATES PATENT OFFICE 2,562,257

TELEVISION RECEIVER CABINET CONSTRUCTION

George W. Bill, Cincinnati, Ohio, assignor to Avco Manufacturing Corporation, Cincinnati, Ohio, a corporation of Delaware Application July 28, 1950, Serial No. 176,450

10 Claims. (Cl. 312—7)

The present invention relates to television receiver cabinets and specifically to a novel, durable, strong and economical television receiver cabinet construction of pleasing appearance.

Television receiver cabinets and chassis construction present a number of problems which are not satisfactorily solved by the use of conventional radio receiver construction practices. The first complication is presented by the added weight of the components which must be supported, such as the cathode ray tube, the large main chassis tray, transformers, loud speaker and a considerable number of tubes, resistors, capacitors and inductors. Although the weight factor did not present any particular difficulties so far as radio receivers were concerned, manufacturers of television receivers have considered conventional radio cabinet constructions to be inadequate for television receivers and have persistently been seeking a more substantial and economical construction.

Accordingly, a fundamental object of the present invention is to provide a cabinet construction featuring an internal metallic skeleton or frame which is adequate to carry relatively large weight loads and at the same time eliminates dowel, and tongue-and-groove joints and articulations, and the breakage and distintegration characteristic of such constructions.

Ancillary to this objective is the provision of a frame construction which possesses a high factor of safety for transportation and handling. This objective is directed to the provision of a relatively light weight cabinet as an acceptable and even preferable substitute for the massive and heavy all-wood cabinets heretofore conventionally employed for television receivers. Transportation and freight charges constitute a major item in the ultimate cost of a television receiver to the consumer, and the present invention, by providing a relatively light but strong cabinet, serves a very worthy purpose in substantially decreasing this cost factor.

Another fundamental object of the present invention is to provide a cabinet construction featuring a metallic skeleton frame, the parts of which may readily be assembled and secured together by standard spot welding operations, a more rapid, efficient and economical mode of fabrication than the multiplicity of machine operations heretofore required in manufacturing all-wood cabinets according to primitive and conventional furniture-making techniques.

One of the limiting factors in the phenomenal growth of the television receiver industry, in which production has not yet become equated to demand, is the availability of cabinets of acceptable appearance and strength. It is highly desirable at this time to remove one of the current "bottle necks" in television receiver production by relieving the cabinet manufacturers of a substantial burden of work per receiver. The invention is addressed to the objective of providing a cabinet which can be assembled by quick and efficient methods and which eliminates a large number of cutting and finishing operations, thereby permitting an acceleration of cabinet production.

A peculiar problem is presented in television receiver cabinetry in that the heat radiated from the electrical components is very substantial in amount, tending to dry out conventional furniture joints and to cause cabinet disintegration. Another major object of the invention is to provide a novel construction for securing the cabinet frame to the exterior panels in such a way that a rigid, neat, secure assembly is maintained throughout the life of the product.

Broadly, an object of the present invention is to provide a cabinet construction including as its major components: a steel skeleton frame made up of readily assembled angle bars, plywood panels or equivalent, and novel means for securing the panels to the frame, said cabinet construction featuring the beauty of the panel material and the strength of the metallic frame, the same being permanently secured together.

The present invention provides a cabinet construction which possesses adequate strength and can be rapidly and economically manufactured in quantity. This object requires that the various components be readily and easily placed in position, that they be quickly articulated, and that welding, adhesive applying, drying, riveting and other processing operations be performed rapidly and accurately. The present invention is now being successfully utilized by one of the major manufacturers of television receivers, and a substantial amount of plant space is being devoted by this manufacturer to heavy mass production of cabinets in accordance therewith.

Another important object of the present invention is to provide a structure in which the metallic frame members present substantially large bearing surfaces or contact areas to the margins of the panels making up the cabinet proper. Disposed between these margins and the abutting flat surfaces or contact areas of the frame members is a pressure sensitive adhesive for securing the top, front, and side panels in place. Further security is assured by providing staples at suitably spaced intervals, these staples projecting through apertures formed in the frame members into the plywood or equivalent material of the panels, the staples being concealed in that they do not project completely through the panels.

A further object of the invention is to provide a considerable contact area between frame members and panels and at the same time to articulate the various frame members in such a way that they present substantially continuous bearing surfaces or contact areas to the panels. Particular attention has been directed to the accomplishment of this object.

Another object of the present invention is to provide, in a cabinet of the character described, an inverted metallic tray which simultaneously performs the functions of supporting the television receiver, partially shielding it from undesired signal pickup, reinforcing the cabinet framework, and presenting additional contact surfaces to the front and side panels, those surfaces being secured to the panels by the adhesive and staples.

Still another object of the present invention is to provide a frame and front panel construction to which a heavy molding may be added with facility.

It is also an object of the invention to provide a cabinet frame construction and back piece which may be readily, easily, and economically manufactured and assembled.

For a better understanding of the present invention, together with other and further objects, advantages and capabilities thereof, reference is made to the following description of the accompanying drawings, in which there is disclosed a preferred illustrative form of cabinet in accordance with the present invention.

Figure 1:
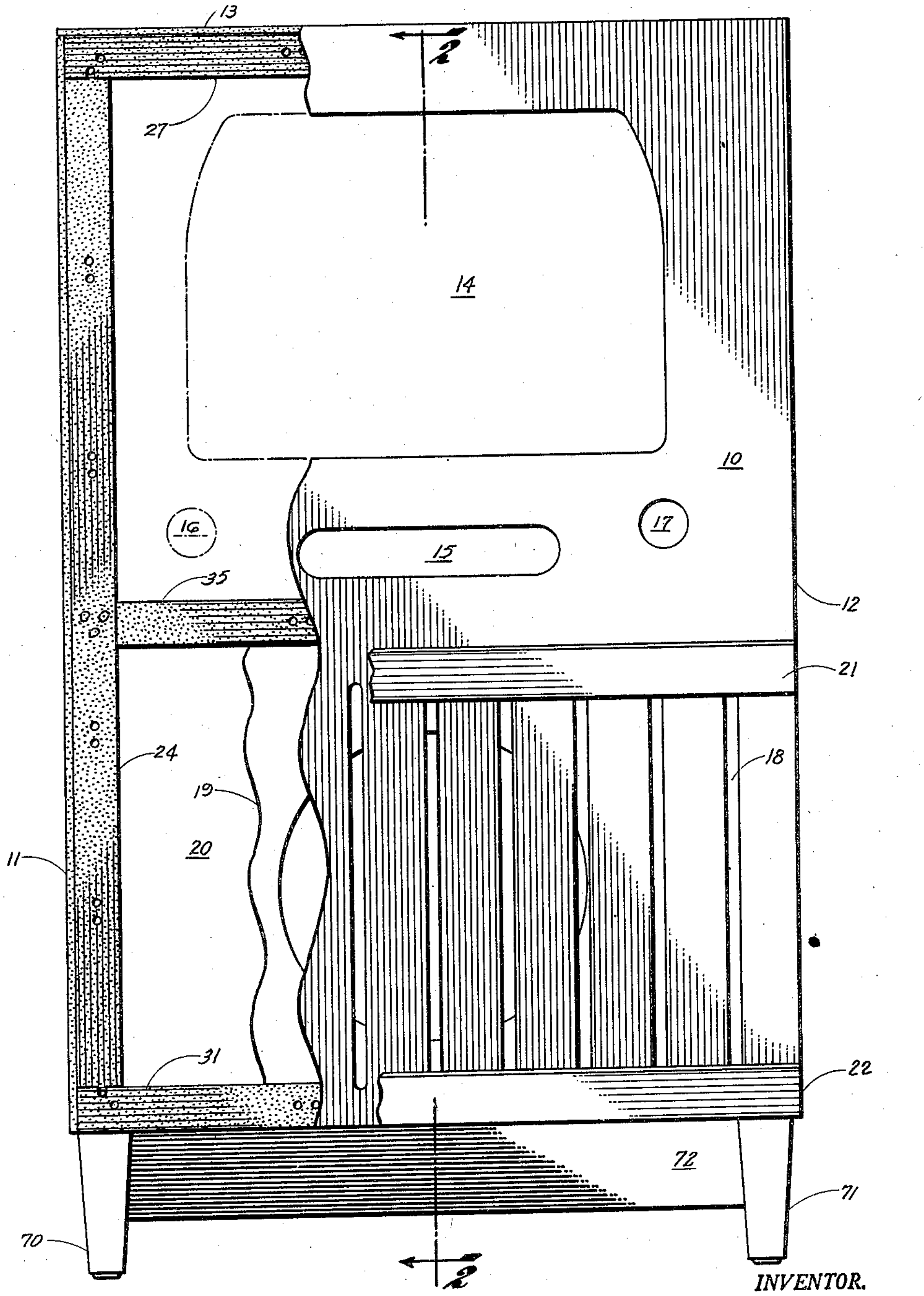
Fig. 1 is a front view of a preferred form of television receiver cabinet construction in accordance with the invention, a portion of the front panel on the left hand side thereof being broken away to show certain details of the metallic frame construction.
Figure 2:
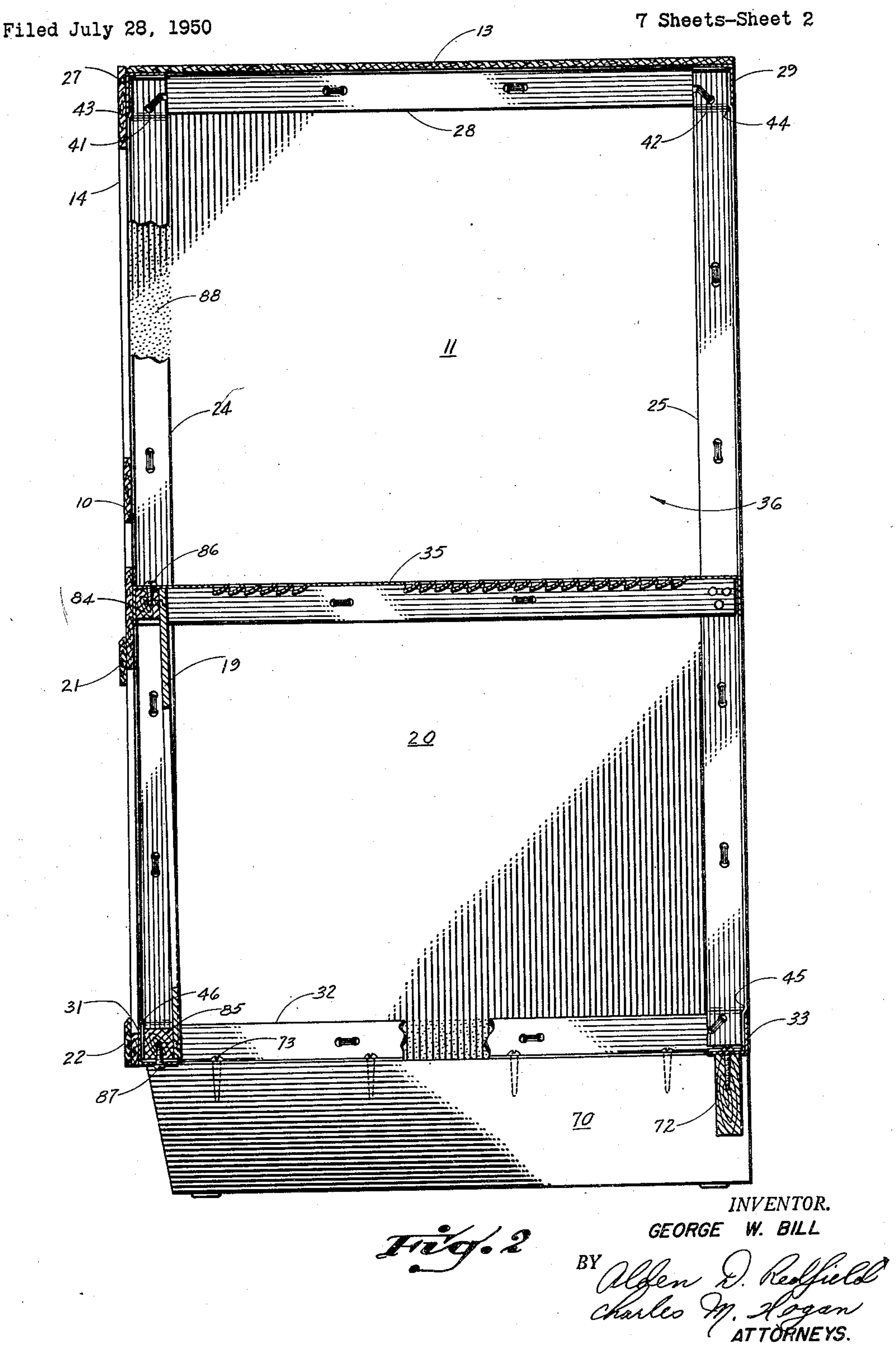
Fig. 2 is a side elevational sectional view taken along the section line 2—2 of Fig. 1 and looking in the direction of the arrows.

Referring now specifically to Figs. 1 and 2 of the drawings, the exterior of the cabinet comprises a front panel 10, a left side panel 11, a right side panel 12 and a top panel 13. These panels are preferably made of a durable, strong plywood, and the exterior panel surfaces are suitably sanded, fine-finished, stained, and polished in a conventional fashion. The front panel is suitably apertured as indicated at 14, 15, and 16—17 (Fig. 1), respectively, to provide for installation of the cathode ray tube mask, a name plate, and the usual tuning and control knobs and shafts. The front panel is also slotted as shown at 18 to provide louvers open to the loud speaker, the latter being mounted on an auxiliary panel 19 disposed behind the front panel 10 and defining the front of a lower compartment 20. Suitable decorative molding 21 and 22 may optionally be secured to the front of the panel 10 above and below the speaker louvers as illustrated in Fig. 1.

The panels are secured to an interior metallic frame comprising thirteen principal structural members. In describing these members the term "angle" is frequently employed. The term as herein used indicates a metallic structural member having two legs preferably disposed at right angles to each other as shown at page 39, Steel Construction, fourth edition, 1941, American Institute of Steel Construction, New York, New York. The problem of manufacture is simplified when the legs are symmetrical, and in my preferred construction they are so disclosed.

Figure 5:
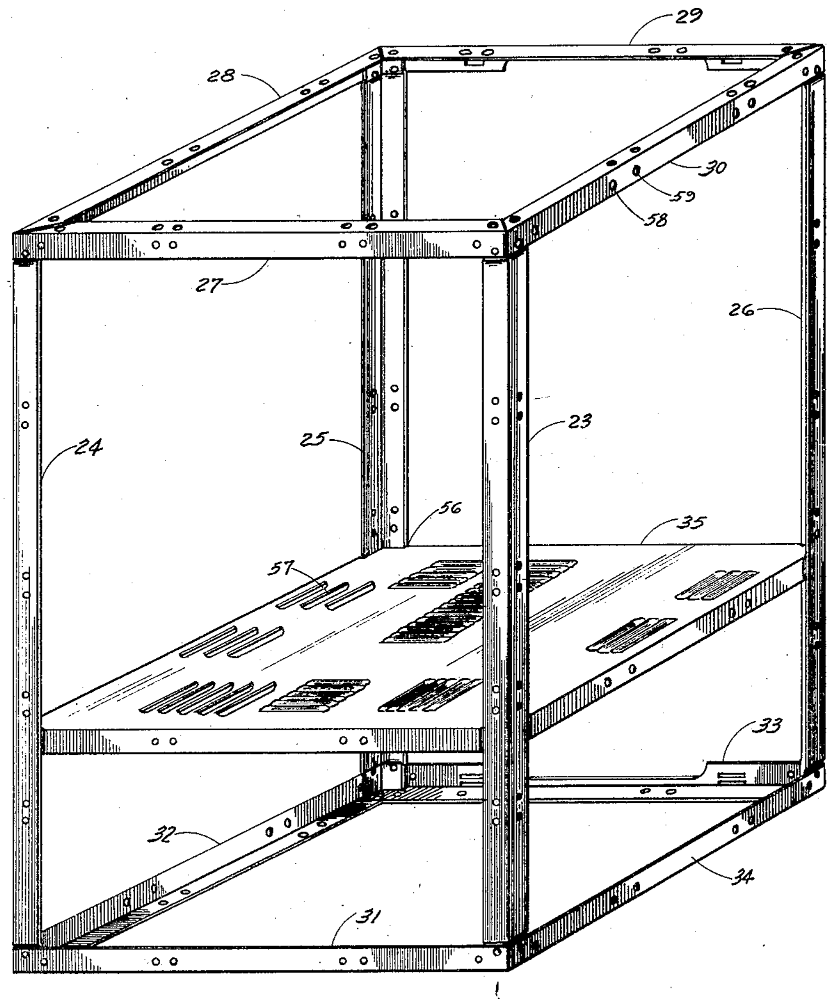
Fig. 5 is a perspective view of the framework per se, including the four top horizontal angles, the four vertical upright angles, the four bottom horizontal angles, and the inverted tray on which the television receiver chassis is supported.

The framework consists of four identical vertical or upright angles 23, 24, 25, and 26 (as best shown in Fig. 5), four top horizontal angles 27, 28, 29, and 30, four bottom horizontal angles 31, 32, 33, and 34, and an intermediate inverted tray 35 which separates the upper receiver compartment 36 from the lower speaker compartment 20 (Figs. 2 and 5). The vertical upright members 23, 24, 25 and 26 define the corners of the framework and are of identical construction.

Figure 10:
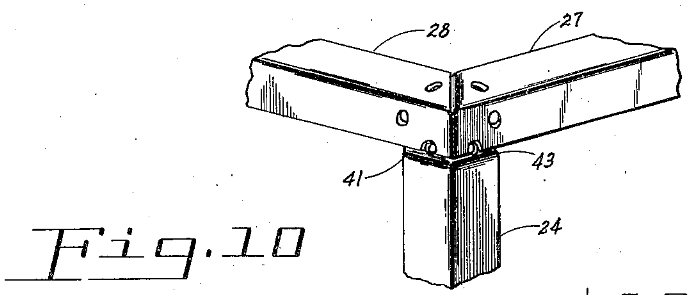
Fig. 10 is a perspective view showing the outside of the upper left-hand front corner of the television receiver cabinet frame.

I prefer to form one integral piece of stock into the angles 28 and 27, as illustrated in Fig. 10. Additionally, I prefer to make the angles 29 and 30 integral. Also, the two angles 31 and 32 are preferably integral, and angles 33 and 34 are preferably of one piece. It will be appreciated that an integral construction comprising such angles as 27 and 28 is substantially the equivalent of two separate and distinct angles. In each case the top legs of such adjoining angles as 28 and 27 are shaped to form a mitred joint. In the Fig. 10 construction the front leg of angle 27 is continuous and integral with the side leg of angle 28, for example.

Figure 3:
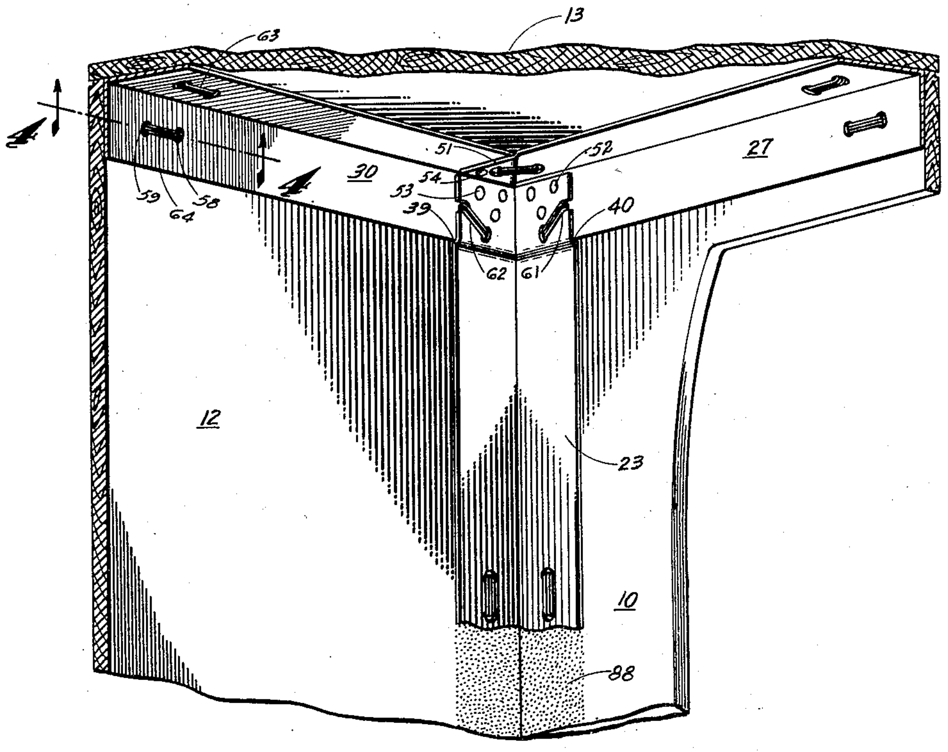
Fig. 3 is a greatly exploded perspective view looking into the interior of the cabinet from the rear and observing the upper front right hand corner of the interior formed by panels 10, 12 and 13.

Each upright angle is appropriately offset at its extremities, as shown at 39 and 40 (Fig. 3), and 41, 42, 43, 44, 45, and 46 (Fig. 2) to underlap the vertically extending legs of the upper and lower horizontal angles. For example, the upper extremity of the side leg of vertical angle 24 is slightly offset as indicated at 41 (Fig. 2) to underlap the side leg of the horizontal angle 28. Similarly, the upper extremity of the front leg of vertical angle 24 is slightly offset as indicated at 43 to underlap the front leg of the horizontal angle 27. Additionally, as shown in Fig. 3, the vertical angle 23 is offset as shown at 39 and 40 to underlap the vertically extending legs of the angles 30 and 27. Similarly, all upper and lower extremities of the vertical upright members are inwardly offset to underlap the vertically extending portions of the top and bottom horizontal angles, as will be apparent from an inspection of Fig. 2, wherein the lower extremity of the rear leg of vertical angle 25 is offset inwardly to underlap the rear leg of the bottom horizontal angle 33. It will also be seen from an inspection of Fig. 2 that the lower extremity of the front leg of vertical angle 24 underlaps the vertically extending front leg of the lower horizontal angle 31. This construction permits all of the four upright members to be identical and results in manufacturing economies and standardization. It will be seen from an inspection of Fig. 5 that each vertical angle, such, for example, as 23, is offset at both of its extremities to form lap joints with a pair of top horizontal angles and with a pair of bottom horizontal angles.

Figure 6:
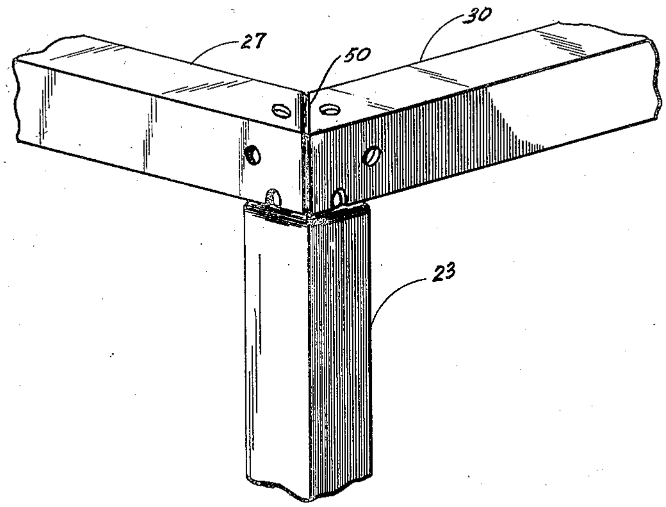
Fig. 6 is a perspective view showing the outside of the upper right-hand corner of the television receiver cabinet frame, the interior of the same corner being illustrated in Fig. 3, and the expression "right-hand" being taken relative to the position of an observer looking at Fig. 1.

As best shown in Figs. 3 and 6, the top leg of each of the horizontal angles located at the sides of the frame is beveled at each extremity, an illustrative beveled edge 50 being shown in Fig. 6. Each top leg adjacent to one of these beveled edges, for example the top leg of angle 27 (Fig. 3), has a complementary underlying end portion such as that numbered 51 which is offset along a diagonal line complementary to the beveled edge to form a shoulder. The shoulder extends upwardly from the offset portion 51 by a distance substantially equal to the thickness of the top leg of angle 30. The top legs of angles 30 and 27 accordingly form a mitred joint, and they present flush surfaces to the top panel.

Referring again to Figs. 3 and 6, it will be seen that the invention provides, in a television receiver cabinet panel supporting frame, a joint construction directed to the presentation of flush surfaces to the exterior top 13, front 10, and side 11 and 12 panels. This joint comprises a vertically extending metallic angle 23 having a front leg (adjacent panel 10) and a side leg (adjacent panel 12), a pair of horizontally extending metallic angles 27 and 30 disposed at right angles to each other and to the vertical angle 23, one 27 of said horizontal angles having a downwardly extending front leg and a horizontally extending top leg, and the other 30 of said horizontal angles having a downwardly extending side leg and a horizontally extending top leg, the top portion of said vertical angle being offset inwardly to form shoulders 39 and 40 extending outwardly a distance substantially equal to the thickness of said downwardly extending legs, whereby said vertical angle 23 forms a lap joint with each of said downwardly extending legs to present flush exterior surfaces to the front and side panels 10 and 12. This joint construction also includes means, such as spot welds indicated by the reference numerals 52 and 53, for securing the vertical angle 23 to the downwardly extending legs at the lap joints. One of said top legs is beveled 50 as illustrated in Fig. 6, and the other of said top legs has a complementary underlying end portion 51 downwardly offset along a line complementary to the beveled edge to form a shoulder extending upwardly by a distance substantially equal to the thickness of a top leg, the top legs accordingly forming a mitred joint and presenting flush surfaces to the top panel 13, and means (indicated by the spot weld 54) for securing the top legs together at the mitred joint. It will be understood that the following articulations are similar to that illustrated in Figs. 3 and 6: (*a*) the joint structure formed by members 24, 27 and 28 (same as Fig. 10), 27 and 28 being integral; (*b*) the joint structure formed by members 25, 28 and 29; (*c*) the joint structure formed by members 26, 29 and 30, 29 and 30 being integral; (*d*) the joint structure formed by members 23, 31 and 34; (*e*) the joint structure formed by members 24, 32 and 31, 32 and 31 being integral; (*f*) the joint structure formed by members 25, 32 and 33; and (*g*) the joint structure formed by members 26, 33 and 34, 33 and 34 being integral. Those articulations being substantially identical to those illustrated in Figs. 3 and 6, or Fig. 10, there is no necessity to describe them in further detail. Applicant prefers a construction in which the extremities of the top legs of the angles 28 and 30, and the bottom legs of the angles 32 and 34 are beveled to a 45 degree angle at their terminals and in which the extremities of the angles 27, 29, 31, and 33 are provided with offset portions which complement the beveled edges to form mitred joints.

It should be particularly noted that the top legs of the horizontal angles 27, 28, 29 and 30 are coplanar and flush with each other, presenting a substantial contact area to the margins of top panel 13. Similarly, the side legs of the vertical angles 23 and 26 and of the horizontal angles 30 and 34 present a large contact or bearing area to the margins of the side panel 12. Also, the side legs of the members 24, 25, 28 and 32 afford a large bearing area for the margins of the side panel 11. Further, the front legs of the horizontal angles 27 and 31 and of the upright angles 23 and 24 present a large bearing area to the front panel 10.

The framework illustrated in Fig. 5 is made of simple components that are easily procured and formed. Its very substantial strength is increased by the provision of an inverted metallic tray 35, positioned in a convenient location intermediate the top set of horizontal angles and the bottom set of horizontal angles. This tray has a metallic top and depending flanges. The corners of the tray are inwardly offset as shown at 56 so that the tray interfits with the corners of the vertical uprights 23, 24, 25 and 26 and at the same time presents to the front and side panels contact surfaces of substantial area which are flush with the front or side legs of the vertical uprights, as appropriate. The tray 35 performs the following functions: (1) it provides a support for the television receiver proper; (2) it serves as a shield and prevents some undesired signal pickup; (3) it stiffens the assembly and prevents buckling of the vertical upright members; and (4) it presents an additional contact surface to the front and side panels. The tray 35 is provided with suitable louvers as indicated by the reference numeral 57 (Fig. 5) to assure adequate structural strength and to provide ventilation openings. The tray is secured to the vertical uprights by spot welding.

It will be observed from an inspection of Fig. 5 that the various structural members are provided at spaced points with pairs of apertures such as those indicated by the reference numerals 58 and 59. Such pairs of apertures are illustratively spaced at intervals of about five inches on all of the legs and flanges of the following members which support the margins or intermediate portions of top, front, and side panels: 27, 28, 29, 30, 31, 32, 33, 34, 35, 23, 24, 25, and 26. The purpose of these apertures will be explained hereinbelow.

Figure 4:
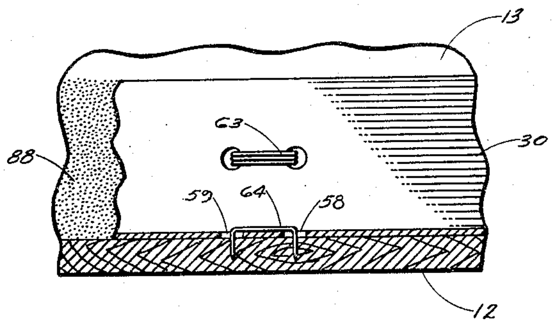
Fig. 4 is a fragmentary sectional view taken on line 4—4 of Fig. 3 and looking in the direction of the arrows.
Figure 7:
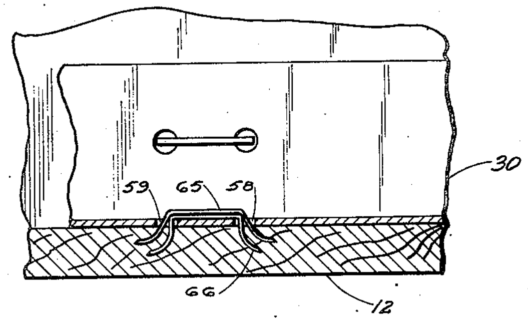
Fig. 7 is a showing of an alternative form of staple and adhesive construction for securing the frame members to the panels, it being understood that the Fig. 7 construction can be substituted for that illustrated in Fig. 4.

The various panels, which are preferably made of mahogany veneer gum plywood or the like, are secured to the metallic frame members by a combination of an adhesive 88, which adhesive is per se of the prior art, and staples. The adhesive and the staples in combination comprise a novel and effective means for securing the panels to the framework. Any strong synthetic rubber base pressure-sensitive adhesive or equivalent will suffice. I prefer to clean the frame and then to dip it in a synthetic primer and to withdraw it slowly to assure a uniform adhesive coat. The primed frame is then dried in air or heat. In production I prefer an approximately three-minuate air dry period followed by the application of heat at 150 degrees Fahrenheit for five minutes. I utilize a neoprene rubber base primer adhesive which is very negative to aliphatic hydrocarbon solvents. The secondary adhesive is then sprayed on to those surfaces of the metallic frame which are adapted to contact the panel interiors. The secondary coat is a two-part mixture, the first of which consists of a blend of synthetic rubbers, synthetic resins, a dispersing agent, and water. The second part of the mixture is known as an accelerator, and its comprises zinc oxide, a dispersing agent, and water. The accelerator component of the secondary coat tends to decrease curing time, and it improves the holding power of the adhesive during aging of the completed cabinet. The secondary coat, as indicated, is applied as by spraying or brushing. It will be understood that both the plywood interior and the metal frame contact surfaces are coated with the secondary adhesive. Only the wood parts are dried after application of the secondary adhesive. On the completion of such coating and the drying operation, and before the coated parts have cooled to any substantial extent, the panels are placed against the framework bearing surfaces and hydraulic-press clamped exteriorly and interiorly under a pressure of 25 to 30 pounds per square inch, and this pressure is maintained for approximately three minutes. In accordance with the invention staples are driven into all corners. For example, in Fig. 3 three sets of staples are provided at the articulation of the members 27, 23, and 30. A plurality of staples 61 is driven through the lap joint formed by the front legs of the members 23 and 27 and into the relatively soft material of the front panel 10. Similarly, a plurality of staples 62 is driven through the lap joint formed by the side legs of members 23 and 30 into the panel 12. Likewise a plurality of staples is driven through the mitred joint formed by the top legs of the members 30 and 27 and into the top panel 13. It will be understood that each corner is similarly arranged, so that the plywood panels are maintained in position by the combination of the adhesive and the outwardly projecting staples. In accordance with the construction illustrated in Figs. 3 and 4, pluralities of staples such as those indicated by the reference numerals 63 and 64 are driven into the panels and through tray flanges and the legs of the angles at convenient intermediate locations to provide additional security for the panels. In the staple construction illustrated in Fig. 4, the set of staples 63 consists of three staples driven side by side. I prefer to employ the construction shown in Fig. 7, wherein a staple 65 having outwardly projecting tangs is driven in on top of a staple 66 also having outwardly projecting tangs. Suitable stapling guns for driving staples in this manner are well known.

It will be obvious from an inspection of Fig. 5 that the articulations of the bottom horizontal angles to the vertical angles are identical to the corresponding articulations of the top set of horizontal angles to the upright angles.

The side and top panels are secured to the flanges of tray 35 by the combination of adhesive and staples.

Figure 8:
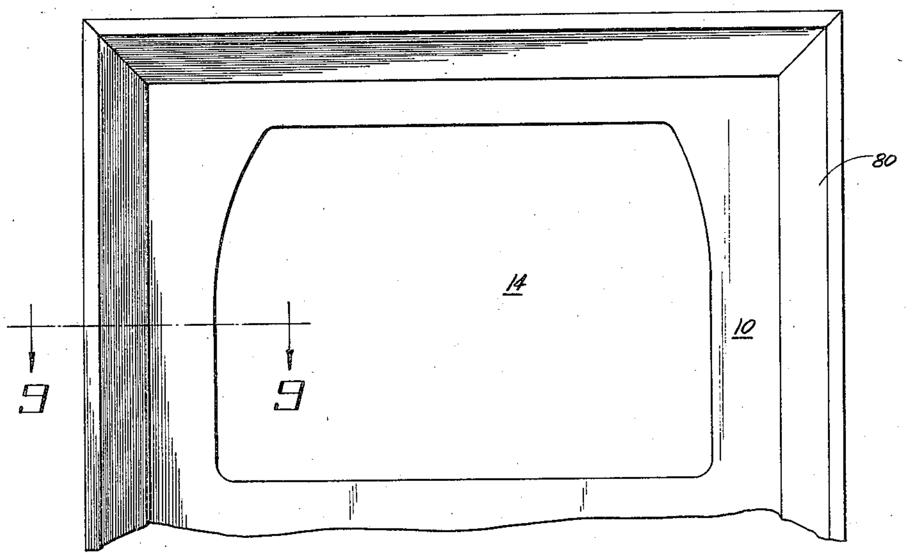
Fig. 8 is a front view of a modified form of cabinet front construction showing a massive decorative molding.
Figure 9:
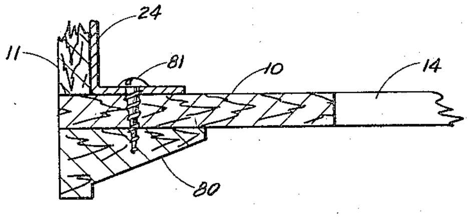
Fig. 9 is a fragmentary sectional view taken along the line 9—9 of Fig. 8, looking in the direction of the arrows.

The present construction possesses the further advantage that a molding such as that indicated by the reference numeral 80 in Figs. 8 and 9 may readily be placed in front of the panel 10 and secured in place by screws 81, spaced at suitable intervals along the molding, the illustrative screw 81 projecting through the front leg of upright angle 24 and panel 10 into the molding 80. Optionally, the above-described adhesive or a suitable equivalent is placed between the members 10 and 80 so that they are secured together by the combination of adhesive and screws.

The cabinet is mounted on a pair of supporting rails 70 and 71. At the rear there is provided a cross member 72 between the supporting rails 70 and 71. Screws such as those indicated by the reference numeral 73 (Fig. 2) are passed through the coplanar bottom legs of the horizontal angles 31, 32, 33 and 34 into the rails 70 and 71 and the cross member 72 to secure the subassembly of frame and furniture panels to the mounting provided by the elements 70, 71 and 72.

From the foregoing it will be seen that the objects of the present invention have been accomplished by providing, in a television receiver cabinet, the combination of front 10, top 13, and side 11, 12 panels, four upright angles 23, 24, 25 and 26 each located at a corner of the cabinet interior, four horizontally oriented angles 27, 28, 29 and 30 arranged in quadrangular formation at the top of the cabinet interior, each of said upright angles having terminal portions forming joints with said horizontal angles, each horizontal angle forming joints with its two adjacent horizontal angles (Figs. 3 and 6), the margins of said top panel 13 being disposed adjacent and in abutment with all of the coplanar top legs of said horizontal angles, the margins of each of said side panels being disposed adjacent and in abutment with the coplanar side legs of a pair of horizontal angles and a pair of upright angles, means comprising a pressure-sensitive adhesive and staples for securing all of the margins to their supporting angles, spot welding means for securing the joined members to each other, a mounting 70, 71, 72 for the subassembly of angles and panels, and an inverted rectangular flanged tray 35 having corners abutting and welded to said vertical angles and depending flanges secured by adhesive and staples to said front and side panels.

Figure 11:
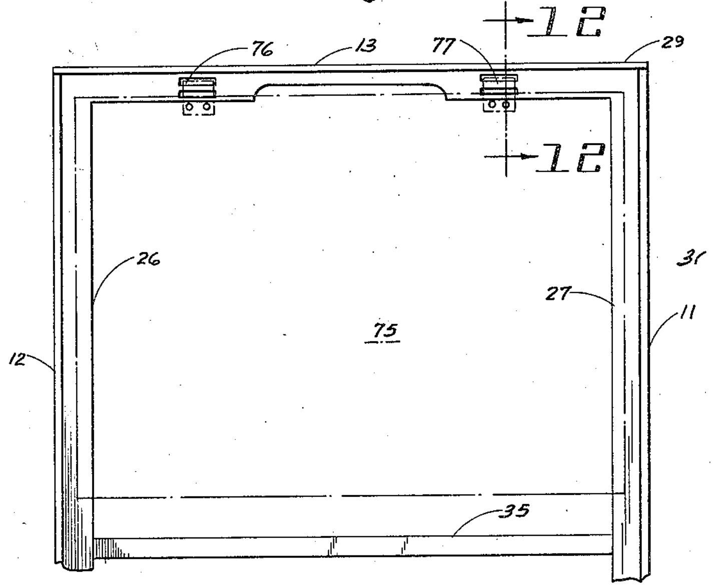
Fig. 11 is a back view of the frame showing the back closure member in dotted outlines.
Figure 12:
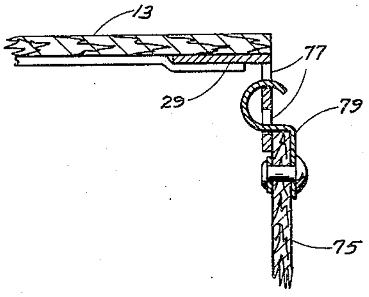
Fig. 12 is a fragmentary sectional view taken along the line 12—12 of Fig. 11 and looking in the direction of the arrows.

In accordance with the underwriters' requirements, I provide a back piece or closure member 75 as illustrated in Fig. 11, this back piece being made of any suitable insulating material having sound absorbing qualities. Spaced pairs of apertures 76 and 77 are provided on the rear top horizontal angle member 29, and the back piece 75 is hinged onto the frame by a pair of hooks, such as 79, engaging the apertures, the hooks being secured to the back piece by rivets.

The baffle 19 is secured in place by adhesion to cross members 84 and 85 (Fig. 2), which in turn are secured to tray 35 and angle 31, respectively, by screws such as 86 and 87.

While there has been shown and described what is at present considered to be the preferred embodiment of the present invention, it will be obvious to those skilled in the art that various modifications and substitutions of equivalents may be made therein without departing from the true scope of the invention as defined by the appended claims.

I claim:

1. In a television receiver cabinet panel supporting frame, a joint construction directed to the presentation of flush surfaces to exterior top, front, and side panels comprising a vertically extending metallic angle having a front leg and a side leg, a pair of horizontally extending metallic angles disposed at right angles to each other and to said vertical angle, one of said horizontal angles having a downwardly extending front leg and a horizontally extending top leg and the other of said horizontal angles having a downwardly extending side leg and a horizontally extending top leg, the top portion of said vertical angle being offset inwardly to form shoulders extending outwardly a distance substantially equal to the thickness of said downwardly extending legs, whereby said vertical angle forms a lap joint with each of said downwardly extending legs to present flush exterior surfaces to the front and side panels, means for securing said vertical angle to said downwardly extending legs at said lap joints, one of said top legs being beveled and the other of said top legs having a complementary underlying end portion downwardly offset along a line complementary to the bevel to form a shoulder extending upwardly by a distance substantially equal to the thickness of a top leg, said top legs accordingly forming a mitred joint and presenting flush surfaces to the top panel, and means for securing said top legs together at said mitred joint.

2. In a television receiver cabinet the combination of front, top, and side plywood panels, four upright angles each located at a corner of the cabinet interior, four horizontally oriented angles arranged in quadrangular formation at the top of the cabinet interior, four horizontally oriented angles arranged in quadrangular formation at the bottom of said cabinet interior, each of said upright angles having inwardly offset terminal portions forming lap joints with said horizontal angles, each horizontal angle having a top leg shaped to form mitred joints with the top legs of its two adjacent horizontal angles, the margins of said top panel being disposed adjacent and in abutment with all of the top legs of the top horizontal angles, the margins of each of said panels being disposed adjacent and in abutment with the side legs of a pair of said uprights and the side legs of top and bottom hozizontal angles, and the margins of said front panel being disposed adjacent and in abutment with the front legs of two of said uprights and the front legs of top and bottom angles, means for securing all of said margins to their supporting angles, and means for securing jointed members to each other.

3. In a television receiver cabinet, the combination of front, top, and side panels, four upright angles each located at a corner of the cabinet interior, four horizontally oriented angles arranged in quadrangular formation at the top of the cabinet interior, each of said upright angles having terminal portions forming joints with said horizontal angles, each horizontal angle forming joints with its two adjacent horizontal angles, the margins of said top panel being disposed adjacent and in abutment with all of the coplanar top legs of said horizontal angles, the margins of each of said side panels being disposed adjacent and in abutment with the coplanar side legs of one of said horizontal angles and a pair of said upright angles, means for securing all of said margins to their supporting angles, means for securing jointed members to each other, and a mounting for said upright angles.

4. In a television receiver cabinet, the combination of front, top, and side panels, four upright angles each located at a corner of the cabinet interior, four horizontally oriented angles arranged in quandrangular formation at the top of the cabinet interior, each of said upright angles having terminal portions forming joints with said horizontal angles, each horizontal angle forming joints with its two adjacent horizontal angles, the margins of said top panel being disposed adjacent and in abutment with all of the coplanar top legs of said horizontal angles, the margins of each of said side panels being disposed adjacent and in abutment with the coplanar side legs of one of said horizontal angles and a pair of said upright angles, means for securing all of said margins to their supporting angles, said securing means comprising a pressure-sensitive adhesive disposed between each margin and its adjacent leg together with staples projecting outwardly through the legs of said angles into the marginal portions of said panels, means for securing jointed members to each other, and a mounting for said upright angles.

5. In a television receiver cabinet, the combination of front, top, and side panels, four upright angles each located at a corner of the cabinet interior, four horizontally oriented angles arranged in quadrangular formation at the top of the cabinet interior, each of said upright angles having terminal portions forming joints with said horizontal angles, each horizontal angle forming joints with its two adjacent horizontal angles, the margins of said top panel being disposed adjacent and in abutment with all of the coplanar tops legs of said horizontal angles, the margins of each of said side panels being disposed adjacent and in abutment with the coplanar side legs of one of said horizontal angles and a pair of said upright angles, means for securing all of said margins to their supporting angles, means for securing jointed members to each other, and a mounting for said upright angles, said mounting comprising four additional horizontal angles disposed at the bottom of the cabinet and articulated to each other and to said vertical uprights in the same manner as the top horizontal angles.

6. In a television receiver cabinet, the combination of front, top, and side panels, four upright angles each located at a corner of the cabinet interior, four horizontally oriented angles arranged in quadrangular formation at the top of the cabinet interior, each of said upright angles having terminal portions forming joints with said horizontal angles, each horizontal angle forming joints with its two adjacent horizontal angles, the margins of said top panel being disposed adjacent and in abutment with all of the coplanar top legs of said horizontal angles, the margins of each of said side panels being disposed adjacent and in abutment with the coplanar side legs of one of said horizontal angles and a pair of said upright angles, means for securing all of said margins to their supporting angles, means for securing jointed members to each other, a mounting for said upright angles, an inverted generally rectangular flanged tray having corners abutting said vertical angles, said corners being inwardly offset so that the downwardly extending flanges of the tray abut said front and side panels, and means for securing the front and side flanges of said tray to said front and side panels.

7. In a television receiver cabinet the combination of front, top, and side plywood panels, four upright angles each located at a corner of the cabinet interior, four horizontally oriented angles arranged in quadrangular formation at the top of the cabinet interior, four horizontally oriented angles arranged in quadrangular formation at the bottom of said cabinet interior, each of said upright angles having inwardly offset terminal portions forming lap joints with said horizontal angles, each horizontal angle having a top leg shaped to form mitred joints with the top legs of its two adjacent horizontal angles, the margins of said top panel being disposed adjacent and in abutment with all of the top legs of the top horizontal angles, the margins of each of said side panels being disposed adjacent and in abutment with the side legs of a pair of said uprights and the side legs of top and bottom horizontal angles, and the margins of said front panel being disposed adjacent and in abutment with the front legs of two of said uprights and the front legs of top and bottom angles, means for securing all of said margins to their supporting angles, and means for securing jointed members to each other, each of said sets of four horizontally oriented angles including two integral pairs.

8. The combination set forth in claim 3 wherein the means for securing said margins to their supporting angles comprises a pressure-sensitive adhesive disposed between each margin and its adjacent leg.

9. The combination set forth in claim 3 wherein the means for securing said margins to their supporting angles comprises a pressure-sensitive adhesive disposed between each margin and its adjacent leg, together with a plurality of spaced fastening means projecting outwardly through the legs of said angles into the marginal portions of said panels.

10. The combination set forth in claim 4 wherein the staples projecting outwardly through the legs of said angles into the marginal portions of said panels comprise one staple superimposed upon another staple.

GEORGE W. BILL.

REFERENCES CITED

The following references are of record in the file of this patent:

UNITED STATES PATENTS

| Number | Name | Date |
|---|---|---|
| 2,377,432 | Lear | June 5, 1945 |
| 2,520,506 | Mankki | Aug. 29, 1950 |